Patented Feb. 10, 1925.

1,525,942

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

FLUID-OPERATED BRAKE SYSTEM.

No Drawing.      Application filed January 31, 1924.   Serial No. 689,815.

*To all whom it may concern:*

Be it known that I, MALCOLM LOUGHEAD, a citizen of the United States, and resident of Detroit, in the county of Wayne and State of Michigan, have invented a certain new and useful Improvement in Fluid-Operated Brake Systems, of which the following is a full, clear, concise, and exact description.

This invention relates to fluid operated brake systems, and particularly to the character of liquid employed in the system. It is desirable that liquids which are employed in the fluid operated brake systems for automobiles and other vehicles shall have certain characteristics. The viscosity of a liquid at relatively high temperatures, such as occur in summer weather, should not be so low that it is difficult to prevent its passage by the pistons in the brake operating cylinders and in the compressor cylinder. At low temperatures 30 or 40° below zero, the viscosity must still be such that the liquid flows readily to permit the easy and certain operation of the brakes.

A further requirement of such a liquid is that it shall have a certain lubricating value, so that the pistons in their movement to and fro in the cylinders will not be subjected to undue wear, and a still further requirement is that the liquid shall not be of such a character as to cause deterioration or disintegration of the rubber of the gaskets and hose lining, or of the cups, whether of leather or composition, employed in connection with the pistons.

It is the object of the present invention to provide a liquid for use in fluid operated brake systems which will fulfill to the highest degree the requirements just above enumerated.

Applicant has discovered that a solution of alcohol and castor oil when combined in the proper proportions provides an extremely satisfactory liquid for use in connection with fluid operated brake systems. It is not essential that any exact proportion of alcohol and castor oil be employed, but a solution containing substantially 50% of each in volume has been found to give exceedingly satisfactory results. However, this proportion may be departed from to a considerable degree and still have a liquid for use in brake systems which is far more satisfactory than those heretofore employed. If, however, a fluid is employed having a too high content of alcohol, it will be difficult to maintain it in the braking system. Furthermore, it will have less lubricating value and its coefficient of expansion will be higher. On the other hand, if the proportion of castor oil is too great, the viscosity of the liquid will be too high, particularly at low temperatures.

For use in very low temperatures, a solution of as much as two parts of alcohol to one part of castor oil may be found desirable, although a solution having these proportions will have a viscosity too low to give the most satisfactory results when used in high temperatures. On the other hand, for use in high temperatures, a solution of two parts of castor oil to one part of alcohol may be found very satisfactory, but this solution is found to have too great viscosity at very low temperatures for the most satisfactory operation. As above explained, a solution of approximately equal parts of alcohol and castor oil has been found to give very satisfactory results when employed in both winter and summer temperatures.

In preparing the solution, ordinary commercial denatured alcohol and technical grade castor oil have been found to be satisfactory.

While above the solution of the present invention has been described as particularly suited to use in the cylinders of brake systems, it will be found to give similar good results when used in shock absorbers and like devices, and the claims should be construed to cover its use in such devices.

Having thus described my invention, what I claim as new and desire to secure by Letters Patent is:

1. A liquid for use in the cylinders of fluid operated brake systems and the like consisting of alcohol and castor oil.

2. A liquid for use in the cylinders of fluid operated brake systems and the like consisting of a solution of castor oil in alcohol.

3. A liquid for use in the cylinders of fluid operated brake systems and the like consisting of alcohol and castor oil in about equal proportions.

4. A liquid for use in the cylinders of fluid operated brake systems and the like consisting of from thirty to seventy percent alcohol and from seventy to thirty percent castor oil.

In witness whereof, I hereunto subscribe my name this 24th day of January, 1924.

MALCOLM LOUGHEAD.

Witnesses:
DAGMAR PETERSON,
FRANK LELIS.